Figure 1:
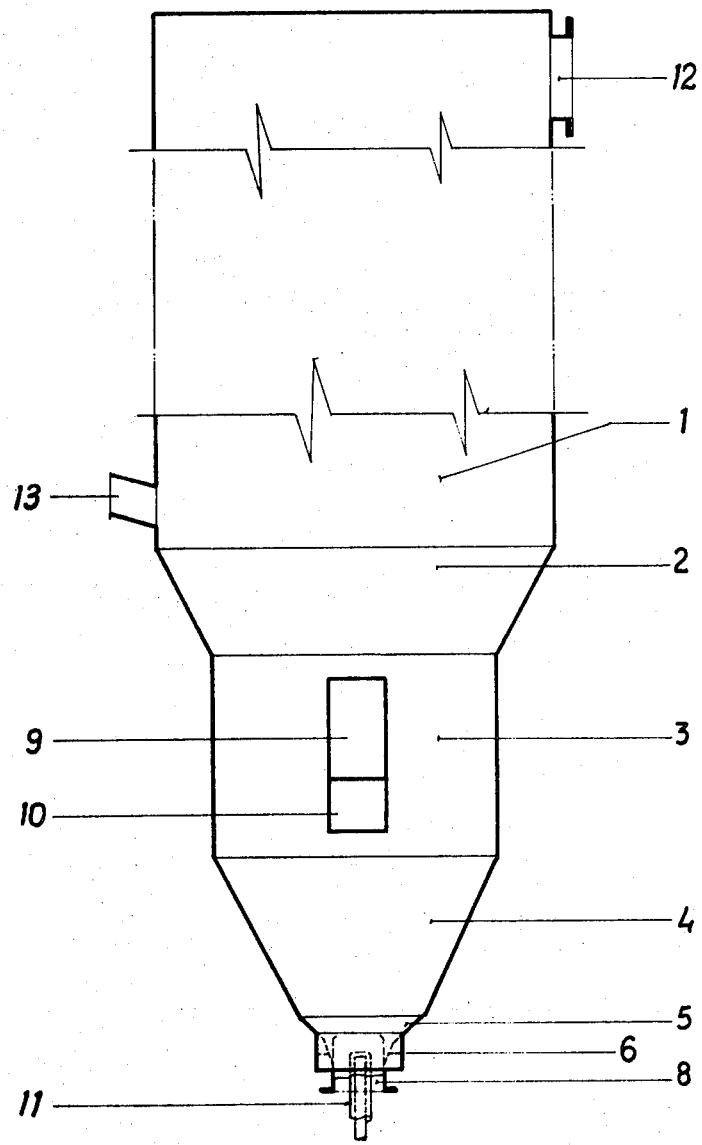

United States Patent

[11] 3,631,608

| [72] | Inventors | Arcangelo Maresca;<br>Giuseppe Ancilletta, both of Siracusa, Italy |
|---|---|---|
| [21] | Appl. No. | 851,358 |
| [22] | Filed | Aug. 19, 1969 |
| [45] | Patented | Jan. 4, 1972 |
| [73] | Assignee | Sincat-Societa Industriale Catanese S.p.A.<br>Palermo, Italy |
| [32] | Priority | Aug. 21, 1968 |
| [33] | | Italy |
| [31] | | 20351 A |

[54] PROCESS AND APPARATUS FOR TREATING PARTICALIZED SUBSTANCES IN A FLUIDIZED BED
19 Claims, 2 Drawing Figs.

[52] U.S. Cl.................................................... 34/10, 34/57 A, 263/21 A
[51] Int. Cl......................................................... F27b 15/00

[50] Field of Search............................................ 34/10, 57, 57 A, 57 B; 263/21, 21 A

[56] References Cited
UNITED STATES PATENTS

| 2,468,508 | 4/1949 | Munday | 34/10 X |
| 3,386,182 | 6/1968 | Lippert | 34/57 A X |

*Primary Examiner*—Charles J. Myhre
*Attorney*—Stevens, Davis, Miller & Mosher

ABSTRACT: A process and an apparatus for carrying out a fluidized bed-type operation wherein a central gas stream is insufflated upwardly through a bed of particles, comprising the addition of an auxiliary gas stream directed through the bed in an upwardly inclined direction towards the central stream.

PROCESS AND APPARATUS FOR TREATING PARTICALIZED SUBSTANCES IN A FLUIDIZED BED

This invention relates to a process for carrying out chemical, physical and chemical-physical operations as, for example, chemical reactions, drying and/or granulating of chemical products and fertilizers, coating of the aforesaid products, etc., in a fluidized bed.

More particularly, this invention relates to a process for carrying out the above-mentioned operations in a fluidized spouting bed with a modified spout, having improved characteristics.

The use of frustoconical fluidized beds or spouting beds has been known for a long time. In an article published in Am. Inst. Ch. Eng. Journal (Vol. 1, No. 2, 1955, pages 157–164), K. B. Mathur and P. E. Ghisler described the drying of wheat by this apparatus.

This apparatus generally consists of a cylinder-shaped container ending at its bottom in an inverted frustoconical part, which is filled with the product up to a certain height.

A pressurized airflow is blown into the apparatus from the bottom and, as a result of the frustoconical shape of the base and of the velocity imparted to the air, said air lifts the central part of the bed, thus creating an actual central spout of particles at the bed's upper surface, while said air is not able to support the peripheral part of the bed close to the walls of the container whereby these particles slip downwardly along the walls until they meet the airflow which again causes them to rise centrally in the spout and then fall again towards the walls and there slide downwardly until they meet the gaseous stream again. The particles thus undergo a cyclic motion, up and down.

Besides their use in drying operations, spouting beds have been employed to dry and granulate chemical products and fertilizers, to prepare compounds starting from various reactants and to coat fertilizers with resins. The materials to be granulated, the reactants which form chemical products and the substances to form the coatings are usually fed into the bed, at the base of the apparatus coaxially with and in the same direction as, the fluidizing gas. The reactants or other materials to be injected may be either in the liquid state, in solution, in suspension or even in the gaseous state.

This technique, however, has been limited so far to small-scale productions and to small-sized apparatus because of various difficulties which are encountered in large-scale apparatus of the type required in large industrial plants in which various of the basic conditions necessary to the regular working of a fluidized spouting bed apparatus are no longer satisfied, namely:

a. the uniform circulation of the particles (provided by the upwards motion in the central zone and by the sliding down along the walls of the apparatus), b. the uniform density of the bed in each horizontal section of the upwards moving gaseous stream, into which the suspensions or solutions are injected.

The uniform circulation mentioned in point (a) is difficult to realize in larger diameter gas conveying pipes because the central zone of the upwards moving gaseous stream tends to contain fewer granules because when the latter slide down the wall of the cone they become incorporated into the peripheral part of the bed and they then cannot reach the gas stream at the center.

As a consequence, the injected liquid or suspension conveyed by the gaseous stream does not meet any obstacle and tends to rise very high, with the risk that it may be drawn out of the apparatus in the form of mist or fine powder, thus reducing the yield and making it necessary to build large gas expansion chambers.

Moreover, because of the formation of aggregated solids in the bed, the stream may open passages therethrough offering less resistance to flow, thus compromising the normal working of the apparatus: in this case a part of the material tends to remain on the cone walls and this condition becomes more and more marked until the growing weight of the stagnating particles surpasses the dynamic pressure of the main gas stream in the middle of the bed whereby there is suddenly placed again into motion a considerable mass of granules which cause such violent and repeated pulsations of the system, as to often endanger the general functioning of the apparatus.

The constant density of the bed mentioned in point (b) is essential in order to obtain a uniform distribution of the solutions or suspensions sprayed onto the granules; in fact, if the spray is admitted into zones having a low density of granules, moist agglomerates are formed, which become thicker and thicker till they prevent the regular flow of gas and particles as described hereinabove, thus causing the apparatus to stop as a consequence of the formation of thick semifused deposits.

One of the objects of this invention, therefore, is to provide a process and apparatus which makes it possible to conduct industrial scale operations of the fluidized bed type with the use of a large size apparatus capable of working uninterruptedly for several days.

Another object is that of obtaining a uniform circulation of the particles within the fluidized bed and a uniform density of the bed in every horizontal section of the upwards moving gas stream.

A further object is that of assuring an improved contact between the injected substances and the particles of said bed.

An additional object is to avoid the formation of deposits and stagnation zones on or close to the walls of an apparatus for creating a fluidized bed.

These and other objects are attained by the process of this invention, which comprises blowing lateral auxiliary gas streams into a spouting bed all around the main upwards moving streams, these auxiliary gas streams being directed obliquely with respect to the latter, so as to reach it above their points of inlet into the bed, and forming at said inlet point angles of between 20° and 70° with the vertical axis of the bed.

The effect of these lateral streams is that the particles which fall along the walls of the apparatus are pushed into the upwards moving gas stream thereby enhancing a uniform circulation of the material in the whole apparatus as well as a uniform density in every horizontal section of the upwards moving gas stream.

Said streams effect a constant distribution of the suspension or solution injected coaxially with the main upwards moving gas stream on all the granules of the bed, preventing moist agglomerates from being formed. Moreover, as they continuously remove the mass which tends to accumulate along the walls, they prevent the formation of deposits thereon.

The aforementioned insufflation of gas laterally with respect to the main stream permits the use of larger diameter conveying pipes without running the risk that the granules form a stagnant peripheral rim around the main upwards moving gas stream.

Another disadvantage overcome by this invention is that of avoiding the losses of the droplets of solution or suspension conveyed by the upwards moving stream, which, when they do not meet any granules on which to be deposited, tend to rise too high, as already stated hereinabove, and thereby be drawn out of the apparatus.

The insufflation of the lateral streams must occur close to the base of the upwards moving main gas stream and in such a way that their axis forms with the axis of the main stream an angle within the range defined hereinabove, and preferably between 35° and 70°.

Of course, the velocity of the lateral streams depends on that of the upwards moving gas stream, on the diameter of the latter, on the density of the bed, etc., besides the type of substances to be treated and the type of reaction to be carried out.

Figure 2:
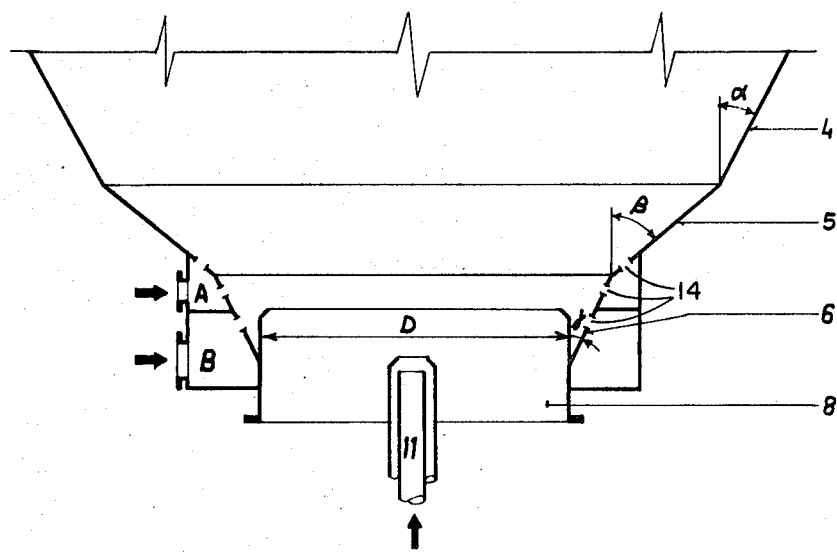

A preferred embodiment of the apparatus to carry out the process of this invention is shown schematically in FIGS. 1 and 2, of which FIG. 1 is an elevation view of an apparatus for conducting fluidized bed-type operations, according to this invention; and FIG. 2 is an elevation view of an enlarged scale of the lower portion of the apparatus of FIG. 1.

The apparatus consists of a vertical, preferably cylinder-shaped, column 1 connected by means of a frustoconical section 2 to a cylinder-shaped section 3, which in turn ends, at its bottom, in three successive frustoconical sections 4, 5, 6 of different taper angle with section 6 extending up to the mouth 8 of the pipe for the upwardly directed main gas stream.

Within the main gas pipe 8 there is positioned one of two coaxial nozzles 11 for feeding the reactants or other materials into the bed.

Column 1 is provided with a gas exhaust pipe 12 and column 3 with an overflow opening 9, which can be regulated by gate valve 10. The overflow opening 9 is at the same height as the upper surface of the bed and allows the treated product to be discharged continuously. Column 1 is also provided, close to its base, with an opening 13 the function of which varies, depending on the operation which is conducted in the bed; for example, when coating a granulated material the opening is used to feed the material; in other operations such as drying, granulating and production of granulated materials, said opening is used for recycling purposes.

The flare angles $\alpha$, $\beta$, $\gamma$ (see FIG. 2) of the frustoconical parts 4, 5 and 8 are respectively in the following ranges:

$\alpha = 25°$ to $35°$
$\beta = 40°$ to $55°$
$\gamma = 20°$ to $30°$

The pipe 8 which introduces the upwards moving gas stream into the bed preferably enters the frustoconical section 6 and is tapered at its end, as shown in FIG. 2.

The lateral auxiliary airflow is preferably insufflated through slots 14 provided in the sidewall of the apparatus, namely in the lower frustoconical sections. Said slots are divided in at least three groups, of which at least two feed into the lower frustoconical section 6 and at least one feeds into the lower part of the intermediate frustoconical section 5. The number and size of these slots is such that the ratio of the slot area in each group to the diameter D of pipe 8 is respectively 2–11 cm.$^2$/cm. for the lower section 6 and 1.5–3 cm.$^2$/cm. for the intermediate section 5.

According to a preferred embodiment of the apparatus each group of slots is arranged in a respective plane which is substantially perpendicular to the axis of the apparatus.

Air is preferably fed into the slots by two or more separate rings arranged around the apparatus, each of which feeds at least one series of slots.

A particularly advantageous system of feeding the auxiliary air is shown schematically in FIG. 2. Air is introduced into the double ring manifold means A and B which extends around the frustoconical section 6 and a part of 5; the sidewalls of these sections being circumferentially provided with three groups of slots, and more precisely:

A first group fed by the tubular ring B at the lower part of the sidewall of the frustoconical section 6, the number and size of the slots being such that the ratio of their area to the diameter D of the pipe 8 is between 6 and 11 cm.$^2$/cm.

A second group at the higher part of the sidewall of section 6, the number and size of the slots being such that the ratio of their area to the diameter D is between 2 and 4 cm.$^2$/cm. This group is fed by the annular pipe A.

A third group at the lower part of section 5, the number and size of the slots being such that the ratio of their area to the diameter D is between 1.5 and 3 cm.$^2$/cm. This group is fed by the annular pipe A.

The injector 11 for the injection of the substances or reactants or coating agents may consist of two concentric nozzles.

The operating conditions (temperature, feeding rate of gases and reactants, airflow rate at the outlet from the slots, etc.) may widely vary, depending on the characteristics of the operation to be performed and the size of the apparatus, for example:

The inlet velocity of the fluidization gas depends on the diameter of the apparatus and varies from 30 to 100 m./sec. as an order of magnitude; it is preferably chosen so as to keep all granules in incipient fluidization phase.

The velocity of the auxiliary air in the slots of the lower part of the frustoconical section 6 varies from 15 to 25 m./sec.

The velocity of the auxiliary air in the slots of the upper part of section 6 and the lower part of section 5 varies from 10 to 15 m./sec.

The feeding rate of the reactants or other substances introduced into the bed is preferably not lower than that of the fluidization gas.

The temperature at which the gas is fed is chosen according to the type of product to be obtained or the treatment to be performed and may reach 500° to 600° C. and even higher.

The average velocity of the gases (fluidization gas, reaction gas, steam, etc.) in column 1 must be so as not to cause excessive dragging. It is generally between 1 and 4 m./sec.

The process of this invention is particularly suitable to carry out the following operations:

1. Preparation of chemical products and pelletized fertilizers starting directly from the reactants of which at least one is liquid or in solution or in suspension, for example:

monoammonium or biammonium phosphate starting from diluted phosphoric acid and ammonia ammonium sulphophosphate starting from diluted phosphoric and sulphuric acids and ammonia disodium and trisodium phosphate starting from diluted phosphoric acid and diluted sodium hydroxide potassium metaphosphate starting from potassium chloride and diluted phosphoric acid supertriple starting from diluted phosphoric acid and phosphate rock ammonium sulfate or nitrate starting from ammonia and the corresponding acids, even very diluted ammonium sulphonitrate starting from ammonium sulfate diluted nitric acid and ammonia; or from ammonium nitrate, diluted sulfuric acid and ammonia; and moreover from diluted nitric acid, diluted sulfuric acid and ammonia sodium or potassium carbonate starting from carbon dioxide and diluted sodium or potassium hydroxides aluminum fluoride starting from hydrogen fluoride or hydrofluoric acid and aluminum hydroxide either in an aqueous suspension or in the solid state complex fertilizers having various titers starting from phosphate rock, diluted sulphuric and/or nitric and/or phosphoric acids, ammonia and, if desired, potassium salts such as e.g. $K_2SO_4$ and KCl complex fertilizers having various titers starting from nitric acid, phosphoric acid, ammonia and, if desired, potassium salts.

2. Granulating and drying of chemical products and fertilizers starting from their solutions or suspensions. The following products may be granulated and dried:

all types of complex and simple fertilizers as e.g. monoammonium and diammonium phosphates, supertriple, binary and ternary complex fertilizers, starting from their aqueous suspensions sodium perborate, sodium sulfate and sodium phosphates, starting from their aqueous solutions or suspensions ammonium nitrate starting from its aqueous solutions or suspensions.

3. Drying of moist salts as e.g. potassium or ammonium sulfate and monoammonium and diammonium phosphate.

4. Granulation of melted salts, e.g. ammonium nitrate.

5. Coating of fertilizers or other products with resins or other materials.

The resin-coated fertilizers slowly liberate their active nutrients into the soil. The coating is effected by contacting the granulated fertilizer in the present apparatus with a resin either dispersed or dissolved in water or in an organic liquid according to the process described in the Italian parent patent application No. 19,717 A/68 filed by the same applicant.

The following examples are given to better illustrate the invention.

EXAMPLE I

Continuous production of monoammonium phosphate starting from diluted phosphoric acid and gaseous ammonia in an apparatus as described hereinabove.

The apparatus is fed with a layer of preformed granules. The process is then started under the following operating conditions:

| | |
|---|---|
| Principal airflow | 20,000 Nm.³/hr. * |
| Auxiliary airflow at the lower collector of the throat | 2,300 Nm.³/hr. |
| Auxiliary airflow at the upper collector of the throat | 700 Nm.³/hr. |
| Height of the bed (measured as the difference in pressure expressed in mm. of $H_2O$ between the bottom and the upper surface of the bed) | 2,200 mm. |
| Temperature of the inlet gas | 450° C. |
| Temperature of the outlet gas | 98° C. |

\* \*Nm.³ = cubic meters calculated at 0° C. and 760 mm. Hg

| | |
|---|---|
| $H_3PO_4$ at 29% by weight at $P_2O_5$ | 8,700 l./hr. |
| $NH_3$ | 1,000 kg./hr. |
| Capacity | 150 T/d. |

The product has the following chemical characteristics:

| | |
|---|---|
| Total $P_2O_5$ | 52.5% |
| Absorbable $P_2O_5$ | 51.8% |
| Water-soluble $P_2O_5$ | 48.5% |
| $N(NH_3)$* | 12.5% |
| $H_2O$ | 1.0% |
| pH | 5.6 |

The granulometry is as follows:

| | |
|---|---|
| <4 mm. | 5% |
| between 3 and 4 mm. | 20% |
| between 2 and 3 mm. | 54% |
| between 1.5 and 2 mm. | 18% |
| between 1 and 2 mm. | 2.8% |
| <1 mm. | 0.2% |

*$N(NH_3)$ = total nitrogen due to $NH_3$

The production of powders, which are separated from the gases at the outlet of the apparatus and which are then recycled, amounts to 1,000 kg./hr.

The recycling of product having a granulometry <1 mm. and of the product having a granulometry <4 mm. ground, separated from the product at the outlet of the apparatus is 7,000 kg./hr. All these fine grade products are fed into the apparatus above the bed.

By adequate modifying the molar ratio $NH_3/H_3PO_4$ (1,250 and 6,900 kg./hr. respectively) it is possible to obtain diammonium phosphate (130 tons/d.) according to the same modalities. In this case, the production of powders, collected in the cyclone amounts to 2,000 kg./hr. and the recycle of product having a granulometry either <1 mm. or >4 mm. is 10,000 kg./hr.

EXAMPLE II

Production of granular 16–20 starting from gaseous ammonia, diluted phosphoric and sulfuric acids and inert materials.

Operating according to the same modalities and with the same apparatus as in example I, the reactor is fed with:

| | |
|---|---|
| Principal airflow | 20,000 Nm.³/hr. |
| Auxiliary airflow at the lower collector of the throat | 2,500 Nm.³/hr. |
| Auxiliary airflow at the upper collector of the throat | 700 Nm.³/hr. |
| Height of the bed | 2,200 mm. |
| Temperature of the inlet gas | 450° C. |
| Temperature at the outlet gas | 98° C. |
| $H_3PO_4$ at 29% by weight of $P_2O_5$ | 3,850 l/hr. |
| $H_2SO_4$ at 60% by weight | 3,300 l/hr. |
| $NH_3$ | 1,450 kg./hr. |
| inert materials: limestone | 650 kg./hr. |
| capacity | 170 t./d. |

The analysis of the finished product is:

| | |
|---|---|
| Total $P_2O_5$ | 20.4% |
| Absorbable $P_2O_5$ | 20.1% |
| Water-soluble $P_2O_5$ | 18.0% |
| N ($NH_3$) | 16.4% |
| $H_2O$ | 0.8% |
| pH | 5.5 | and its granulometry is:

| | |
|---|---|
| <4 mm. | 3 |
| between 3 and 4 mm. | 13.5 |
| between 2 and 3 mm. | 74.5 |
| between 1.5 and 2 mm. | 6.5 |
| between 1 and 1.5 mm. | 1.5 |
| >1 mm. | 1.0 |

The production of powders, which are subsequently recycled, amounts to 1,200 kg./hr. The recycling of product having a granulometry either <1 mm. or >4 mm., duly ground, is 4,000 kg./hr.

By adequately modifying the $H_3PO_4/H_2SO_4/NH_3$ ratios it is possible to produce granular 20—20 fertilizer according to the same modalities.

EXAMPLE III

Production of granular 10—10—10 ternary fertilizer starting from Gafsa phosphate rock, diluted sulphuric and nitric acids, gaseous ammonia, limestone and KCl.

Under similar conditions as in the foregoing examples, with the same principal airflow, the same height of the bed, and with airflows of 2,600 Nm.³/hr. at the lower collector of the throat and 700 Nm.³/hr. at the upper collector, a gas temperature of 300° C. at the inlet of the granulator and an outlet temperature of 100° C., the reactor is fed with:

| | |
|---|---|
| Gafsa phosphate rock | 1,505 kg./hr. |
| $NH_3$ | 295 kg./hr. |
| KCl at 60.5% by weight of $K_2O$ | 718 kg./hr. |
| limestone | 121 kg./hr. |
| $H_2SO_4$ at 68% by weight | 705 l/hr. |
| $HNO_3$ at 55% by weight | 1,400 l./hr. |
| capacity | 100 t./d. |

The analysis of the finished product gives the following results:

| | |
|---|---|
| Total $P_2O_5$ | 10.5% |
| Absorbable $P_2O_5$ | 10.2% |
| water-soluble $P_2O_5$ | 4.0% |
| Total N | 10.2% |
| N ($NH_3$) | 5.5% |
| N ($NO_3$) | 4.7% |
| $K_2O$) | 10.2% |
| $H_2O$ | 1.2% |
| pH | 5.0 |

The granulometry is as follows:

| | |
|---|---|
| <4 mm. | 1.5% |
| between 3 and 4 mm. | 12.0% |
| between 2 and 3 mm. | 80.0% |
| between 1.5 and 2 mm. | 6.5% |
| between 1.0 and 1.5 mm. | — |

And moreover:

| | |
|---|---|
| powders to be recycled | 800 kg./hr. |
| recycle of ground product having a granulometry <1 mm. or >4 mm. | 4,000 kg./hr. |

EXAMPLE IV

Production of supertriple

In an apparatus like the one used in the foregoing examples, having the same principal and auxiliary airflow as in example I, the same height of the bed, an inlet gas temperature of 450° C. and an outlet gas temperature of 98° C., the reactor is fed with:

| | |
|---|---|
| Peeble phosphate at 33.3% by weight of $P_2O_5$ | 2,450 kg./hr. |
| $H_3PO_4$ at 28% by weight of $P_2O_5$ | 5,300 l./hr. |

The capacity of the plant is 140 t./d.

The supertriple obtained has the following characteristics:

| | |
|---|---|
| Total $P_2O_5$ | 49.2% |
| Absorbable $P_2O_5$ | 48.4% |
| Water-insoluble $P_2O_5$ | 44.0% |
| $H_2O$ | 1.5% |

The granulometry is as follows:

| | |
|---|---|
| <4 mm. | 3% |
| between 3 and 4 mm. | 38% |
| between 2 and 3 mm. | 45% |
| between 1.5 and 2 mm. | 12% |
| between 1 and 1.5 mm. | 1.5% |
| >1 mm. | 0.5% |

The production of powders to be recycled is 800 kg./hr.; the recycle of ground product having a granulometry <1 mm. or >4 mm. is 5,000 kg./hr.

EXAMPLE V

Concentration—Granulation—Drying of monosodium and disodium phosphate.

The apparatus described in the foregoing examples—having the same principal and auxiliary airflow as in example I, the same height of the bed, an inlet gas temperature of 450° C. and an outlet gas temperature of 100° C.—is fed with 8,000 kg./hr. of an aqueous solution of monosodium and disodium phosphate at 62 percent by weight of $H_2O$.

The capacity of the apparatus is 50 t./d.

The product obtained continuously has the following composition:

| | |
|---|---|
| water-soluble $P_2O_5$ | 51.1% |
| Na | 27.8% |
| Fe | 0.016% |
| $H_2O$ | 0.3% |
| pH | 7.0 |

The granulometry is

| | |
|---|---|
| <0.8 mm. | 13.3% |
| between 0.4 and 0.8 mm. | 45.0% |
| between 0.2 and 0.4 mm. | 35.0% |
| >0.2 mm. | 6.7% |

The fine particles resulting from cycloning (1,500 kg./hr.) and the ground product having a granulometry <1 mm. or >4 mm. (10,000 kg./hr.) are recycled into the apparatus, above the bed.

EXAMPLE VI

Granulation—Drying of sodium perborate

The same apparatus as described in the foregoing examples is fed with a suspension of perborate, under the following conditions:

| | |
|---|---|
| Principal airflow | 20,000 Nm.³/hr. |
| Auxiliary airflow at the lower collector of the throat | 2,100 Nm.³/hr. |
| Auxiliary airflow at the upper collector of the throat | 600 Nm.³/hr. |
| Height of the bed | 2,500 mm. |
| Temperature of the gas at the inlet of the granulator | 100° C. |
| Temperature of the gas at the outlet of the granulator | 40° C. |
| Aqueous suspension of perborate at 40% by weight of $H_2O$ | 4,200 kg./hr. |
| Capacity | 25 t./d. |

The analysis of the product is:

| | |
|---|---|
| active $O_2$ | 10.4% |
| $Na_2O$ | 20.3% |
| $B_2O_3$ | 23.0% |
| Apparent density | 0.6 kg./l. |

The granulometry is as follows:

| | |
|---|---|
| <0.8 mm. | 5.5% |
| between 0.4 and 0.8 mm. | 48.8% |
| between 0.2 and 0.4 mm. | 44.0% |
| >0.2 mm. | 1.7% |

The recycled powders amount to 100 kg./hr. and the recycle of product having a granulometry <1 mm. or >4 mm. is 1,000 kg./hr.

EXAMPLE VI

Coating of a 20–10–10 ternary fertilizer with polyvinyl acetate.

The same apparatus as described in the foregoing examples is fed through 13 with 5,000 kg. of a 20–10–10 ternary fertilizer granulated according to the method of example V.

Its granulometric characteristics are as follows:

| | |
|---|---|
| <4 mm. | 3.0% |
| between 3 and 4 mm. | 16.0% |
| between 2 and 3 mm. | 74.0% |
| between 1 and 2 mm. | 7.0% |
| >1 mm. | — |

The apparatus is fed with an aqueous dispersion of a polyvinyl acetate at 20 percent by weight through nozzle 11.

The operating conditions are as follows:

| | |
|---|---|
| Principal airflow | 20,000 Nm.³/hr. |
| Auxiliary airflow at the lower collector of the throat | 2,500 Nm.³/hr. |
| Auxiliary airflow at the upper collector of the throat | 700 Nm.³/hr. |
| Height of the bed | 2,200 mm. |
| Inlet air temperature | 72° C. |
| Outlet air temperature | 50° C. |
| Polyvinyl acetate dispersion flow | 500 kg./l. |

After 1 hour, the feeding is stopped and the fertilizer is discharged through the overflow 9 which is opened by increasing the flow of fluidization gas.

The fertilizer coming out of the apparatus is covered with a uniform polyvinyl acetate coating: the resin content is about 2 percent by weight, as referred to the fertilizer.

The fine particles resulting from cycloning (about 150 kg.) are recycled through 13, together with the fertilizer to be fed.

What is claimed is:

1. Process for carrying out chemical, physical and physical-chemical operations, such as chemical reactions, drying and/or granulating of chemical products and fertilizers and coating of the aforesaid products in a fluidized spouting bed wherein a fluidized spouting bed of particles to be treated is created, in a cylinder-shaped container having a plurality of frustoconical parts and ending at its bottom in an inverted frustoconical part, by means of an axial upwardly directed gas stream, characterized in that auxiliary gas streams are insufflated laterally through said bed towards said axial fluidizing stream and obliquely with respect to the latter as to reach it above their point of entry into the bed, and forming at said point of entry, with the vertical axis of the bed, angles of from 20° to 70° in order to accelerate the movement of the pass of particles within the bed and to push the particles which are at the bottom of said bed towards the central part of the axial fluidizing stream.

2. Process according to claim 1 characterized in that said angles are from 35° to 70°.

3. Process according to claim 1 characterized in that the lateral streams are insufflated close to the base of the upwards moving stream.

4. Process according to claim 1 characterized in that the lateral streams are insufflated at a plurality of points in a common plane along the outer periphery of said bed at the base portion thereof.

5. Process according to claim 1 characterized in that the main upwards moving stream has a velocity of 30 to 100 m./sec.

6. Process according to claim 5 characterized in that the velocity of the air insufflated laterally is between 10 and 25 m./sec.

7. Process according to claim 4 characterized in that the lateral streams are insufflated at a plurality of groups of points, each group comprising a plurality of said points in a common plane, and said planes being perpendicular to the vertical axis of the bed.

8. Process according to claim 7 characterized in that the lowermost extent of the outermost periphery of said bed converges in a downward direction in three successive stages, a one of said group of points being in the intermediate one of said stages and another two of said groups of points being in the lowermost one of said stages.

9. Apparatus for carrying out a fluidized bed-type treatment upon a mass of particalized material comprising: a cylindrical vertically extending chamber having a plurality of frustoconical portions and ending in an inverted frustoconical portion containing a bed of said particalized material therein and including a fluidized gas stream insufflation means for insufflating a fluidizing gas stream upwardly through said bed along the vertical axis thereof, and further including an auxiliary gas insufflation means for insufflating obliquely to said upwardly moving fluidizing gas stream a plurality of gas streams through said bed toward said fluidizing stream.

10. The apparatus of claim 9, wherein said auxiliary gas insufflation means is arranged to direct said streams through said bed at an angle of from 20° to 70° relative to said vertical axis.

11. The apparatus of claim 9, said base portion, as seen in vertical section, tapering downwardly along three successive extents, the intermediate one of said extents having a larger angle of taper than either of the two other of said extents.

12. The apparatus of claim 11, the taper angle of said extents from the uppermost to the lowermost being, respectively, in the range of 25° to 35°, 40° to 55°, and 20° to 30°.

13. The apparatus of claim 11, the taper angle of said intermediate extent being in the range of 40° to 55° and the taper angle of the other two extents being not more than 35°.

14. The apparatus of claim 13, said auxiliary insufflation means comprising a series of holes in the intermediate one of said extents and two series of holes in the lowest one of said extents, the holes in each said series of holes all being coplanar, and means to feed pressurized gas to all said holes.

15. The apparatus of claim 14, the holes in each of said series of holes being symmetrically disposed about said vertical axis.

16. The apparatus of claim 11, said main gas insufflation means comprising a circular pipe leading into the bottom end of said chamber and opening into the lowermost of said extents, said auxiliary insufflation means comprising a respective plurality of holes in the intermediate and in the lowest one of said extents the ratio of the area of the plurality of holes in the intermediate extent to the diameter of said pipe being 1.5 to 3 cm.$^2$/cm. and the corresponding ratio for the lowermost extent being 2 to 11 cm.$^2$/cm.

17. The apparatus of claim 14, each said series of holes being in a plane which is substantially perpendicular to said axis.

18. The apparatus of claim 14, said means to feed pressurized gas to said holes comprising a manifold means extending around said base portion and communicating with all the holes in at least one of said series of holes, an inlet for feeding gas into said manifold means.

19. The apparatus of claim 14, said series of holes each being in a respective plane substantially perpendicular to the vertical axis of the chamber and in vertical succession relative to each other, said main gas insufflation means comprising a circular pipe leading into the bottom end of said chamber and opening into the lowermost of said extents, the ratio of the total area of the holes of each said series to the diameter of said pipe being respectively from the lowermost of said series of holes to the uppermost, 6 to 11 cm.$^2$/cm., 2 to 4 cm.$^2$/cm., and 1.5 to 3 cm.$^2$/cm.

* * * * *